Figure 1:
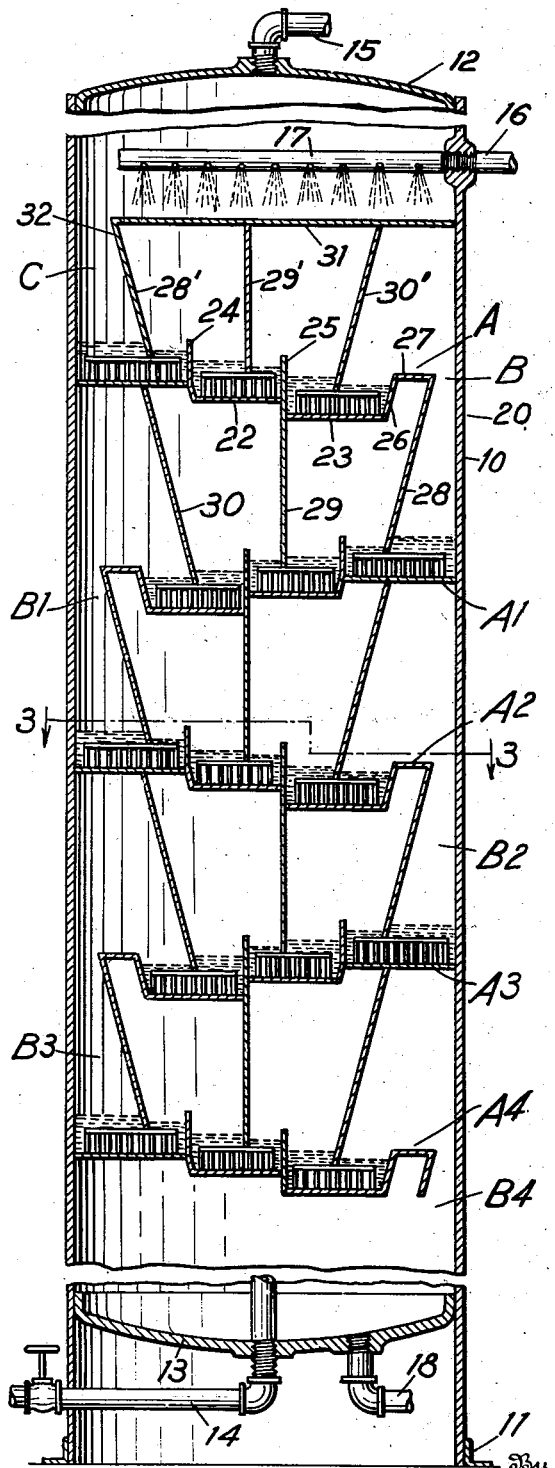

April 16, 1940.   W. M. WELCH   2,197,199
BUBBLE TOWER
Filed Dec. 18, 1937   5 Sheets-Sheet 1

Inventor
William M. Welch
Jack A. Dilley
Attorney

April 16, 1940. W. M. WELCH 2,197,199
BUBBLE TOWER
Filed Dec. 18, 1937 5 Sheets-Sheet 2

Inventor
William M. Welch

By Jack A. Ashley
Attorney

April 16, 1940.  W. M. WELCH  2,197,199
BUBBLE TOWER
Filed Dec. 18, 1937  5 Sheets-Sheet 3
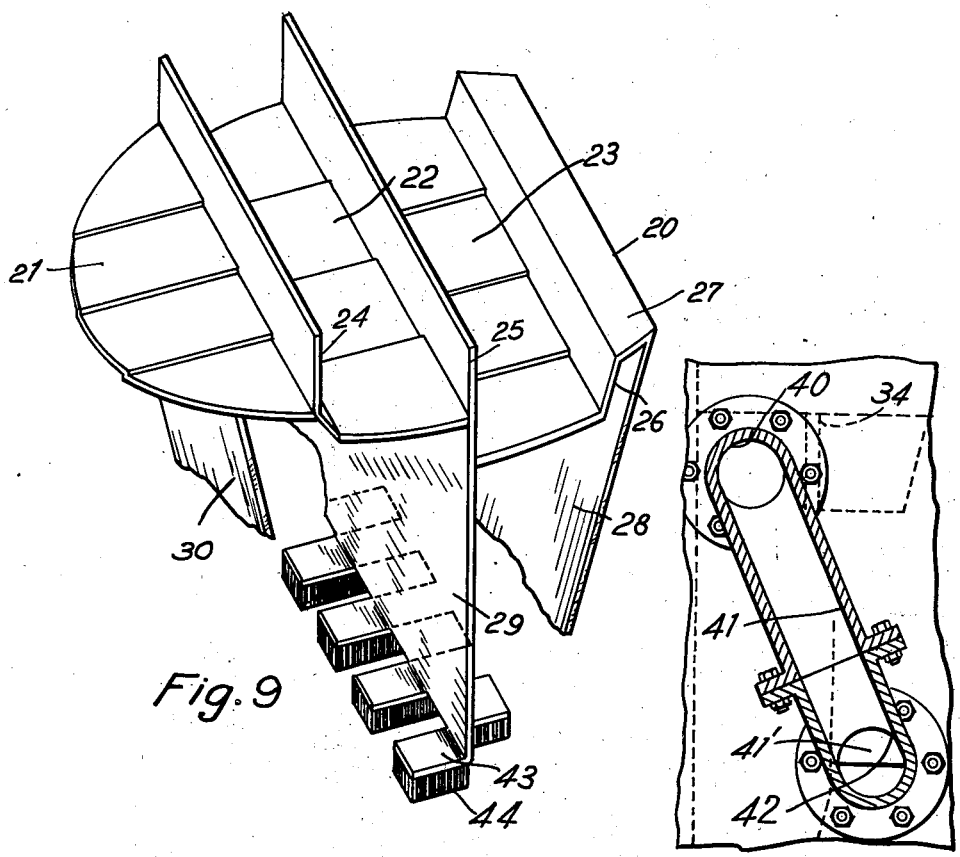
Fig. 9
Fig. 8
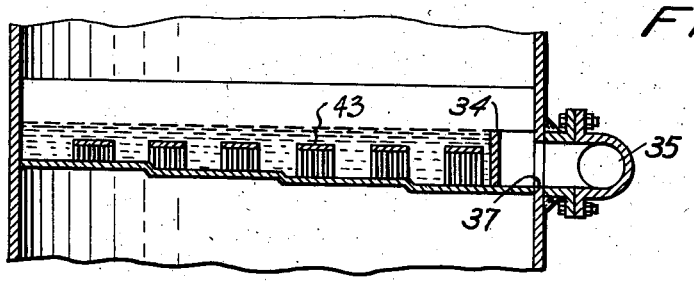
Fig. 7
Inventor
William M. Welch
By Jack A. Ashley
Attorney April 16, 1940.  W. M. WELCH  2,197,199
BUBBLE TOWER
Filed Dec. 18, 1937  5 Sheets-Sheet 4

Inventor
William M. Welch
By Jack A. Schley
Attorney

April 16, 1940.  W. M. WELCH  2,197,199
BUBBLE TOWER
Filed Dec. 18, 1937  5 Sheets-Sheet 5

Inventor
William M. Welch
By Jack A. Behley
Attorney

Patented Apr. 16, 1940

2,197,199

UNITED STATES PATENT OFFICE 2,197,199

BUBBLE TOWER

William M. Welch, Austin, Tex.

Application December 18, 1937, Serial No. 180,537

12 Claims. (Cl. 261—114)

This invention relates to new and useful improvements in devices for promoting liquid-vapor or liquid-gas contact, which devices are generally referred to as bubble towers.

One object of the invention is to provide an improved tower for fractionating the vaporized products of distillation in refining and for various purposes in combining and separating liquids, gases and vapors in natural gasoline manufacture, as well as for use in manufacturing processes of other industrial arts.

An important object of the invention is to provide a bubble tower having a plurality of improved decks therein, with means for directing a liquid downwardly over the decks and for conducting the gas upwardly over the decks, said decks being so constructed that a positive and prolonged contact between the liquid and gas is had, which assures maximum efficiency of the tower.

A particular object of the invention is to provide a tower wherein improved decks are mounted one above the other, the structure of said decks being such that a plurality of trays may be located on each deck, whereby the number of decks may be minimized which permits the height of the tower to be materially reduced, which reduces the length of liquid and vapor lines, lessens insulation requirements, avoids long ladders or stairs, and generally reduces cost of the tower; the construction also reduces weight which permits the tower to be completely fabricated at the factory.

Another object of the invention is to provide an improved tower, wherein the gas or vapor must pass below the surface of the liquid in the trays and must also flow over the entire area of each tray before it can pass to the next tray, whereby channeling of the gas or vapor through the liquid is eliminated.

A further object of the invention is to provide a bubble tower having a plurality of superposed decks therein, each deck having a plurality of transverse trays thereon, with means for conducting the liquid downwardly of the tower and longitudinally through the trays; the gas or vapor moving upwardly through the tower and transversely through each tray, whereby said gas or vapor is introduced into the flowing liquid at a right angle to its line of flow which assures positive contact and admixture of the gas or vapor with the liquid.

Still another object of the invention is to provide an improved bubble tower having a plurality of superposed decks therein, each deck having depending partitions thereon, which partitions are arranged to have their lower ends located within the trays of the deck therebelow so that a liquid seal around such partitions may be formed in said trays, whereby the gas or vapors must pass beneath the partitions and through the liquid in the trays to travel through the tower; the partitions having means on their lower ends extending into the liquid within the trays for agitating and breaking up the liquid and gas to increase the admixture thereof.

A particular object of the invention is to provide an improved bubble tower, wherein adjustable means is provided for maintaining the liquid level at a predetermined height in each tray, whereby a proper liquid level is maintained at all times.

A construction designed to carry out the invention will be hereinafter described, together with other features of the invention.

Figure 2:
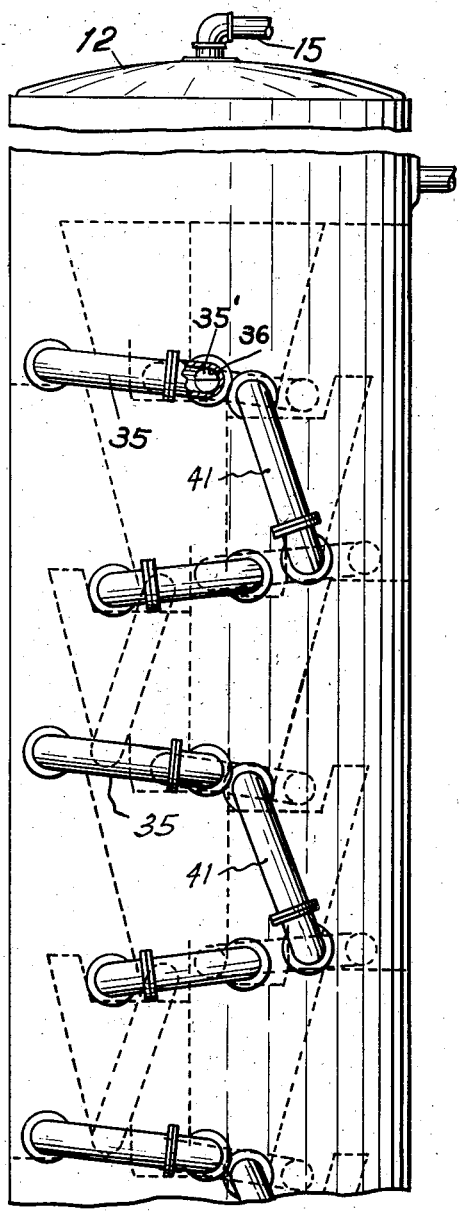
Figure 3:
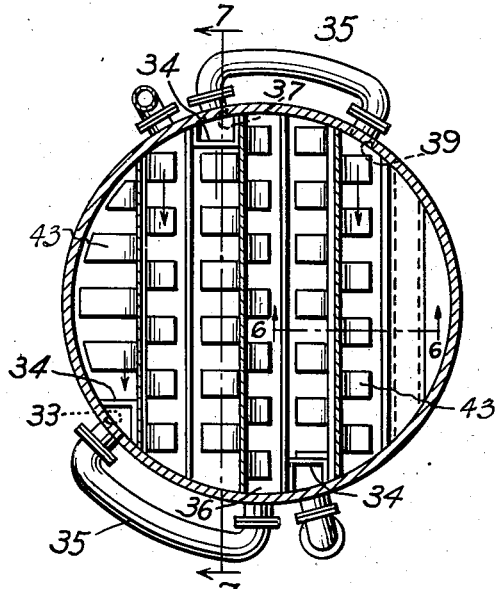
Figure 6:
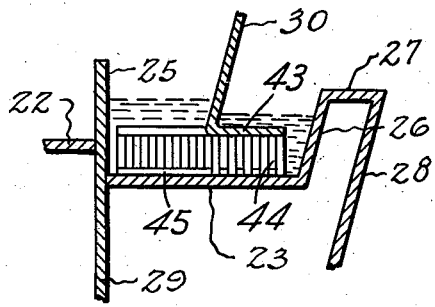
Figure 4:
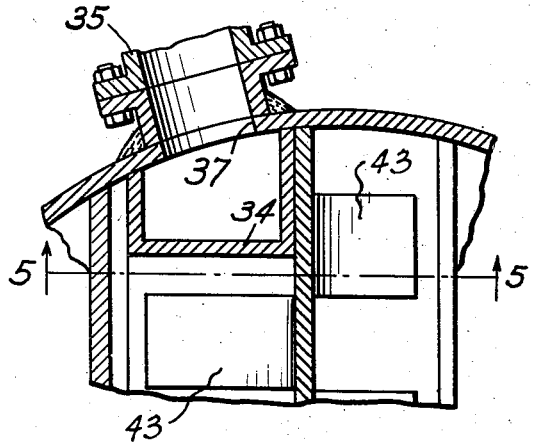
Figure 5:
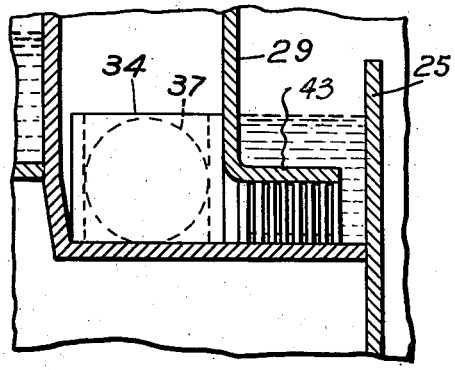
Figure 10:
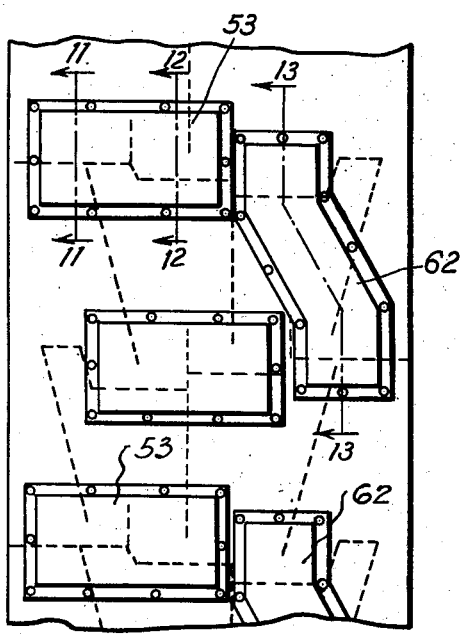
Figure 13:
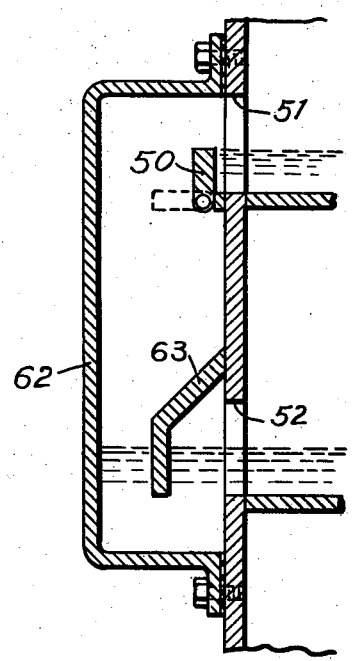
Figures 11, 12:
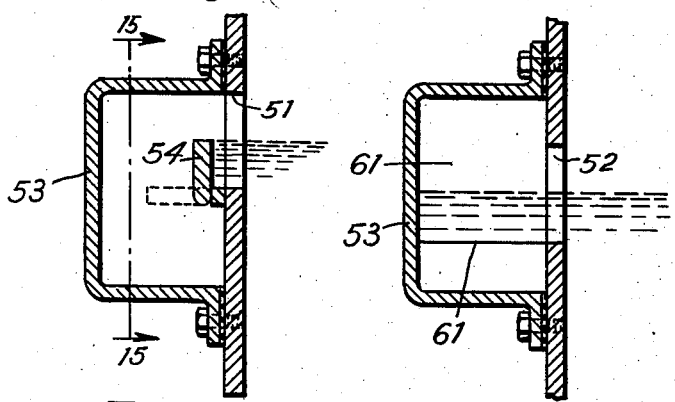
Figure 14:
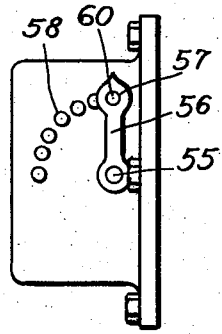
Figure 15:
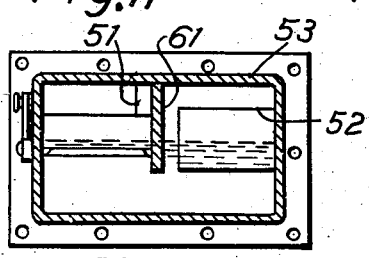

The invention will be more readily understood from a reading of the following specification and by reference to the accompanying drawings, in which an example of the invention is shown, and wherein:

Figure 1 is a transverse, vertical, sectional view, of a bubble tower constructed in accordance with the invention, Figure 2 is a partial elevation thereof, Figure 3 is a horizontal, cross-sectional view, taken on the line 3—3 of Figure 1, Figure 4 is an enlarged horizontal, cross-sectional view, taken through one of the weirs, Figure 5 is a transverse, vertical, sectional view, taken on the line 5—5 of Figure 4, Figure 6 is a transverse, sectional view of the lower portion of one of the partitions, taken on the line 6—6 of Figure 3, Figure 7 is a transverse, vertical, sectional view, taken on the line 7—7 of Figure 3, Figure 8 is a vertical sectional view, taken through one of the liquid conductors which connect the decks, Figure 9 is an isometric view of one of the decks, Figure 10 is a partial elevation of a tower having a modified form weir therein, Figure 11 is a vertical, sectional view, taken on the line 11—11 of Figure 10, Figure 12 is a vertical, sectional view, taken on the line 12—12 of Figure 10, Figure 13 is a vertical, sectional view, taken on the line 13—13 of Figure 10, Figure 14 is an end elevation of one of the lateral conductors of the modified form, Figure 15 is a longitudinal, sectional view, taken on the line 15—15 of Figure 11.

Figure 16:
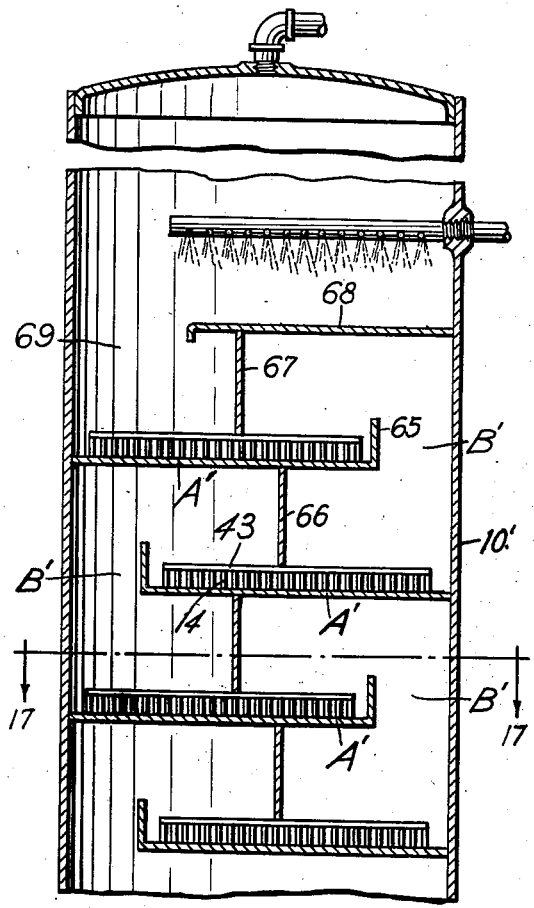
Figure 18:
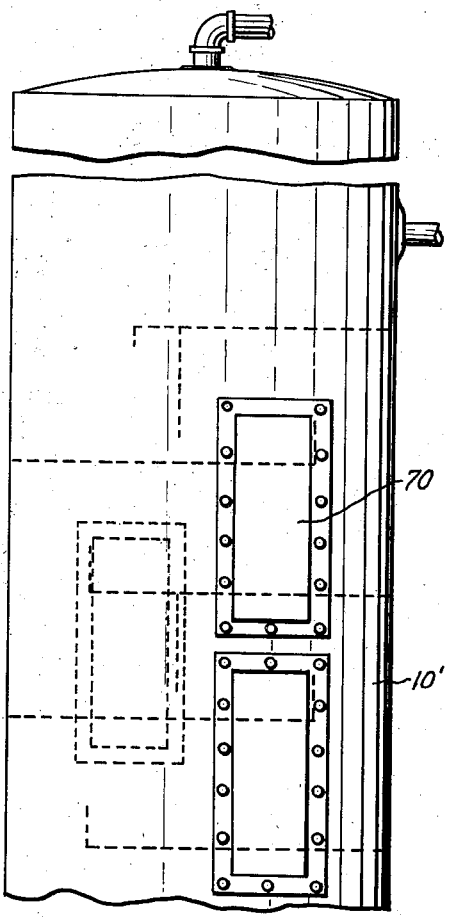
Figure 17:
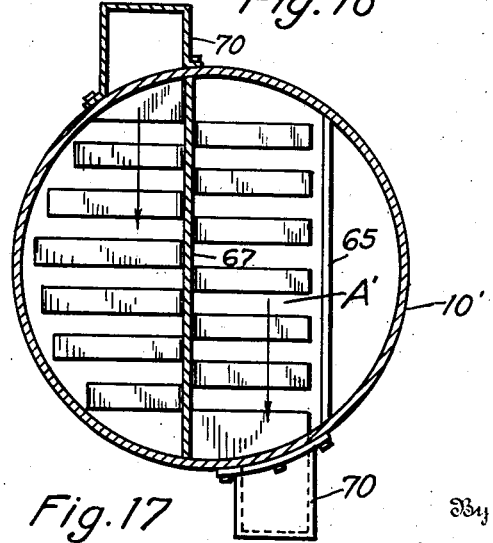

Figure 16 is a partial transverse, vertical sectional view of another form of the invention, Figure 17 is a horizontal cross-sectional view taken on the line 17—17 of Figure 16, and Figure 18 is a partial elevation of this form of the invention.

In the drawings, the numeral 10 designates a tank or shell which is cylindrical in cross-section and which has a supporting base flange 11 at its lower end. The upper end of the shell is closed by a dome or cap 12 while a false bottom 13 is secured within the shell at the lower end thereof. A gas or vapor inlet pipe 14 extends through the false bottom and releases gas or vapor into the lower end of the tank or shell, whereby said gas may pass upwardly therethrough. A gas outlet 15 leads from the dome or cap 12 to conduct the gas from the interior of the tank.

A plurality of superposed decks A, A1, A2, A3 and A4 are mounted within the shell as will be explained, and the gas or vapors rising within the tank or shell, is directed over these decks. The liquid, such as oil, is introduced into the tank or shell through an inlet pipe 16 located at the upper end of the tank. A transversely extending spray pipe 17 is disposed within the tank above the uppermost deck A and has connection with the inlet 16, whereby the liquid is sprayed downwardly into the interior of the tank. Although it is preferable to spray the liquid into the tank, it may be introduced in any suitable manner.

The liquid flows downwardly over the superposed decks, as will be explained, while the gas or vapors rising in the tank are directed over the decks into contact with the liquid thereon. After passing through the liquid on all of the decks, the remaining gas rises from the uppermost deck and escapes through the gas outlet 15. The liquid, after flowing over all of the decks, falls downwardly onto the false bottom from where it escapes through an outlet conductor 18 which leads from said bottom. It is pointed out the particular construction of the tank 10 with the gas or vapor and liquid inlets and outlets form no part of the present invention and is, therefore, subject to variation.

The superposed decks, which are mounted within the tank 10, are of exactly the same construction and it is believed that a description of one will suffice. Referring to Figure 9 wherein the uppermost deck A is shown, it will be seen that this deck has a general circular shape, whereby it substantially conforms to the contour of the inner wall surface of the tank. The deck is formed with a flat side 20 and when said deck is within the tank, the peripheral arcuate edge of said deck engages the tank wall. However, the flat side 20 of the deck does not engage the wall but is spaced therefrom to provide a vertical passage B between the deck and wall (Figure 1). The arcuate periphery of the deck which engages the tank wall is suitably secured thereto by welding, bolting, or otherwise. Thus, it will be seen that in effect, the deck forms a transverse partition or wall which extends across the tank and which has the passage B at one side thereof. Therefore, the only way in which gas or vapor from below the deck can flow into the space above the partition is through said passage.

The deck is formed with a trio of transverse trays 21, 22 and 23 which are disposed in stepped order, whereby each tray is in a different horizontal elevation. The uppermost tray 21 is separated from the second tray 22 by a transverse baffle 24 which baffle is a continuation or extension of one longitudinal wall of the tray 22. The baffle 24 extends some distance above the bottom of the upper tray 21 and forms one side wall thereof, the other walls of said tray being formed by the inner wall of the tank or shell 10 (Figure 3). The second or intermediate tray 22 is separated from the lowermost tray 23 by a baffle 25, which is similar to the baffle 24 and which is an extension of one of the longitudinal sides of the lowermost tray. The baffle 25 extends above the bottom of the intermediate tray 22 and forms one longitudinal side thereof, but the upper edge of this baffle terminates in a horizontal plane below the upper edge of the baffle 24, due to the fact that the intermediate tray 22 is below the uppermost tray 21 in a horizontal plane.

As above described, the lowermost tray 23 has one side wall extended upwardly to form the baffle 25 and the end walls of both the trays 22 and 23 are formed by the inner wall of the tank or shell. For forming the other longitudinal side wall of the lowermost tray 23, which wall may be referred to as the outer side wall, the bottom of the tray 23 is bent upwardly to provide this wall 26. The top of this wall terminates in a horizontal plane below the upper edge of the baffle 25, as is clearly shown in Figure 9. After the wall 26 is formed, the material, of which the deck is constructed, is bent to form a horizontally or laterally extending shelf 27 and said material is then bent downwardly to provide an inclined partition 28 which depends from said shelf. This partition has its vertical edges contiguous to the tank wall and it is this partition which forms the flat side 20 of the deck A, and the passage B, hereinbefore referred to, is provided between the partition and the arcuate tank wall.

In addition to the partition 28, a central partition 29 depends from the deck A, this latter partition being a continuation of the baffle 25 which separates lower tray 23 from the intermediate tray 22. A third partition 30 depends from the bottom of the uppermost tray 21 and is spaced from the central partition 29. The central partition is, preferably, substantially vertical while the partitions 28 and 30 are inclined so that their lower ends are disposed closer to the central partition than their upper ends. The partitions 28, 29 and 30 divide the space below the deck A into compartments, or chambers, and in order for the gas or vapor in one of these chambers to pass therefrom into the adjacent chamber, said gas must flow beneath the lower edges of the partitions. The lower ends of the partitions are adapted to extend into the stepped trays of the deck A1 next therebelow and for this reason, said partitions have different vertical lengths, as is clearly shown in Figure 1. Preferably, the area or space of all of the compartments formed by the partitions is equal.

Above the uppermost deck A and below the liquid inlet spray pipe 17, a substantially circular hood 31 is secured to the inner wall of the tank. This hood is flat and has a portion thereof cut away at 32 to form a flat side, whereby a space or passage is similar to the passage B, but is disposed diametrically opposite the same in a higher horizontal plane. An inclined partition 28', similar to the partition 28 of the deck A, depends from the hood and has its lower end disposed within the uppermost tray 21 of the deck A. A central partition 29', similar to the partition 29, depends from the hood into the intermediate tray 22 of the deck A, while a third partition 30' depends from the hood into the lowermost tray 23 of said deck. Obviously, the partitions 28', 29' and 30' divide the space between the hood 31 and the deck A into chambers or compartments, just as the partitions 28, 29 and 30 divide the space below the deck. Communication between the space below the deck A and the space above said deck is established through the passage B, while communication between the space above the deck and that above the hood is established through the passage C.

As before stated, all of the decks are constructed in the same manner. The partitions 28, 29 and 30 of the deck A extend into the trays 21, 22 and 23 respectively of the next below deck A1. The flat side 20 of the deck A1 which forms a passage B1 is located diametrically opposite and in a horizontal plane below the passage B, being vertically alined with the passage C. The partitions of the deck A1 extend into the trays of the deck A2, which has its passage B2 diametrically opposite and below the passage B1 of the deck A1, and in alinement with the passage B of the deck A. This arrangement continues with each deck having its partitions extending into the trays of the deck therebelow and the passages of each deck below located diametrically opposite the passages of the adjacent decks.

The gas or vapors which enter the tank or shell 10 through inlet pipe 14 rise upwardly in the tank and through the passage B4 of the lowermost deck A4. The gas then flows beneath the partition 30 of the deck A3, which causes it to flow transversely through the lowermost tray 23 of the deck A4. From the tray, the gas passes into the chamber or compartment between the partitions 29 and 30 of the deck A3 and from this chamber, it flows transversely through the intermediate tray 22 of the deck A4. The gas then passes to the compartment between the partitions 28 and 29 of the deck A3 and then beneath the latter partition and transversely of the uppermost tray 21 of the deck A4. Upon escaping from the tray 21 of the deck A4, the gas rises through the vertical passage B3 of the deck A3, after which it travels successively through the trays of this deck. The travel of the gas or vapors is thus continued throughout all of the trays of all of the decks until finally the gas escapes through the passage C in the hood 31 to the gas outlet 15 in the dome of the tank. From the foregoing, it will be seen that the gas or vapor is caused to travel transversely within each tray of each deck within the tank. Its passage through each tray is assured by the partitions which extend into the trays and beneath which said gas or vapors must pass to reach the next tray. The compartments formed by the partitions are sufficiently large to permit the heavier particles to fall by gravity, out of the gas into the trays and these heavier particles are not carried over from one compartment to the next.

All of the trays of the decks have a liquid level maintained therein, whereby the gas passing through the trays contacts or is admixed with and must bubble through said liquid to continue its progress through the tank. The liquid, as has been explained, is introduced into the tank 10 through the pipe 17 and is sprayed downwardly onto the hood 31, from where it falls downwardly through the passage C into the uppermost tray 21 of the uppermost deck A. An outlet opening 33 is provided in the wall of the tank at one end of the tray 21 and the bottom of the tray is gradually lowered in stages or stepped order, as shown in Figure 9, toward this opening. The opening is surrounded by a weir or overflow member 34 which is angular in cross-section and which is secured to the wall of the tank and also to the bottom of the tray (Figures 4 and 5). The upper end of the weir is open and in order for the liquid to escape from the tray 21 it must rise to a level above the top of the weir and thus the height of the weir determines the level of the liquid standing in the tray. The weir is of such height that its top is in a horizontal plane above the lower edge of the partition 28' of the hood and below the upper edge of the retaining baffle 24 which separates the trays 21 and 22, whereby the liquid standing within the tray is at a sufficient level to form a liquid seal around the lower edge of the partition but is not sufficient to overrun the baffle. Therefore, a liquid level is maintained in the tray.

When the liquid in the tray reaches a sufficient level to overflow the weir 34, it flows through the opening 33 and into a conductor 35 which is connected to the opening. The other end of the conductor is connected with an opening 36 formed in the tank wall at one end of the second or intermediate tray 22, whereby the overflow liquid passes to the intermediate tray. This conductor is preferably made in two sections, flanged together and said conductor is suitably secured to the tank wall. A baffle 35' is located at the lower end of the conductor 35 adjacent the opening 36 and the baffle is of such height that its lower edge is in a horizontal plane below the liquid level in the tray 22, whereby said lower edge is always submerged in liquid. This forms a liquid seal around the baffle 35' and prevents gas from the chamber above the tray 22 from entering the conductor and flowing therethrough into the next tray 21. Thus, by-passing of the gas through the conductor is prevented.

The tray 22 has its bottom gradually lowered in stepped order longitudinally from the opening 36 to the opposite end of said tray, where an outlet opening 37, similar to the outlet 33 at the end of the tray 21, is provided. The opening 37 is enclosed by a weir 34 of the proper height so as to maintain the proper liquid level within the tray 22. A conductor 35 extends from the opening 37 to an opening 39 which is provided in the tank wall adjacent one end of the lowermost tray 23 of the deck A. An outlet opening 40 is formed at the opposite end of the tray 23 and the bottom of the tray is gradually lowered from the opening 39 to the opening 40 to induce flow of the liquid longitudinally through the tray toward the outlet opening. The opening 40 is enclosed by a weir 34 of the proper height to maintain a predetermined liquid level in the tray 23. The outlet opening 40 has one end of a substantially vertical conductor 41 connected thereto and the other end of said conductor is connected with an inlet opening 42 provided at one end of the uppermost tray 21 of the deck A1, which is next below the deck A. The conductor 41 is similar in construction to the conductors 35 and has a baffle 41' (Figure 8) in its lower end for preventing by-passing of gas from the deck A1 to the deck A through said conductor 41. The liquid is then conducted through the trays of each deck in successive order in the same manner as the liquid flows through the trays of the uppermost deck A, which has been described. A liquid level is therefore maintained in each tray as the liquid flows downwardly of the tank and a liquid seal is maintained around the lower end of the partitions which extend into the trays. Upon escaping from the lowermost tray 23 of the lowermost deck A4, the liquid falls onto the false bottom from where it is conducted by the outlet pipe 18.

The operation of the device is obvious. The liquid enters the uppermost tray 21 of the top deck and flows longitudinally through said tray toward the outlet 33 from which it passes to the next tray 22 and flows longitudinally therein in a direction opposite to the flow in the tray 21. From the tray 22, the liquid is conducted to the lowermost tray 23 of the unit, in which tray it flows longitudinally in a direction opposite to the flow in the tray 22. From the tray 23 the liquid is directed to the next deck A1, through its trays in the same manner, then to the deck A2, and so on until it has passed through all of the trays of all of the decks. The arrangement of the weirs 34 at the outlet openings of each tray maintains a liquid in each tray at a sufficient level to form a liquid seal around the lower ends of the partitions which extend into the trays.

At the same time that the liquid is traveling downwardly through the trays, the gas or vapors introduced into the tank at the lower end are moving upwardly through the trays. Due to the liquid seal around the lower ends of the partitions, the gas must pass below the liquid level and transversely of each tray in order to flow into the next tray. By-passing of gas through the conductors 35 and 41 is prevented by the baffles 35' and 41' within said conductors. Therefore, a positive and intimate contact between the gas and liquid is assured and it is impossible for the gas to escape from one tray to the next without passing through the liquid.

For more intimately admixing the liquid and gas and for breaking up the liquid and gas particles, the lower ends of the partitions are provided with outwardly or laterally extending flat lugs or projections 43 which are disposed alternately on each side of each partition. The lugs may be formed by slitting the lower end of the partition and then bending the cut portion outwardly, as is clearly shown in Figure 6. A plurality of vertical parallel bars or strips 44 depend from the peripheral portion of each lug and have their lower ends resting on the bottom of the tray. The bars form a cage and the lower ends of said bars may be suitably braced by tie bars 45. The flat lugs 43, and cages carried thereby, are submerged in the liquid and are contacted not only by the liquid but also by the gas or vapors which pass therethrough and act to break up the same to enhance the intimate contact of the liquid with said gas or vapors.

From the foregoing, it will be manifest that the liquid flows downwardly in the tank, while the gas travels upwardly. The liquid flows longitudinally through the trays, while the gas passes transversely through each tray which is at a right angle to the line of flow of said liquid. This flow of liquid and gas assures an intimate contact and admixture therebetween, which permits the liquid to absorb all of the valuable gases and thus produce efficient results. All stand pipes and bubble caps are eliminated and a plurality of trays are formed on each deck, whereby the number of decks necessary may be reduced, which permits the tank to be made of less height with the resulting advantages of reduced cost, fewer parts and more efficient operation. It is noted that although five decks have been shown and described, more or less depending upon conditions, as well as results sought, may be employed. The trays of each deck are illustrated as in different horizontal planes but could, if desired, be in the same plane.

In many instances, it will be desirable to change the liquid level which is maintained within the trays of the decks and therefore, the stationary weirs 34 which are disclosed in the Figures 3 to 5 would be unsuitable. In place of the stationary weirs, adjustable weirs 50 are provided and the construction of the conductors and tank is as shown in Figures 10 to 15. In place of the cylindrical outlet 33 at the end of the uppermost tray 21, the tank wall is provided with a rectangular opening 51 which is located at the end of the tray. A similar rectangular opening 52 is formed in the tank wall adjacent the intermediate tray 22 and a conductor 53, angular in cross-section, is bolted on the exterior of the tank and establishes communication between the openings so that the liquid may flow from the tray 21 to the tray 22. This conductor takes the place of the conductor 35 shown in the first form.

For controlling the flow from the tray 21 into the conductor 53 through the opening 51, a vertical weir or plate 54 has its lower end secured to a laterally extending shaft 55, which is mounted contiguous to the lower end of the opening 51. The shaft has one end extending through the wall of the conductor and has an adjusting arm 56 secured thereto. The arm has an opening 57 in its free end and this opening is adapted to register with any one of a plurality of recesses 58, which recesses are disposed on the exterior of the wall of the conductor in an arcuate path. A pin 60 extends through the opening 57 and is adapted to engage in one of the recesses. Manifestly, by swinging the arm the shaft 55 is rotated to swing the weir or plate 54, whereby its upper edge is moved to different horizontal levels to control the liquid level maintained in the tray 21. The arm 56 may be locked in any of its adjusted positions by the pin 60 and recess 58.

The inner end of the shaft 55 is journaled within a baffle 61 which is mounted within the conductor 53 (Figure 15) and this baffle extends substantially vertically within said conductor. The lower edge of the baffle is in a horizontal plane below the liquid level in the tray 22, whereby a liquid seal around said baffle is formed, which prevents gas from the tray 22 by-passing through the conductor 53. Thus, it is manifest that the conductor 53 serves the same purpose as the conductor 35 in the first form.

In place of the vertical conductor 41 in the first form which establishes communication between decks, a conductor 62 (Figure 13) is provided. This conductor is similar in construction to the conductor 53, being bolted to the tank wall, and leads from the outlet 51 of the lowermost tray 23 of the deck A to the inlet 52 of the uppermost tray 21 in the deck A1. Adjacent the outlet 51, an adjustable weir 50 is mounted and controls the liquid level in the tray 23. In place of the baffle 61 in the conductor 53, the vertical conductor 62 is provided with a hood 63 which is located therein and which has its lower edge in a plane below the liquid level in the tray 21 of the deck A1, whereby the liquid seal around the hood prevents gas from by-passing through the conductor.

The conductors 53 are employed for connecting the trays of one deck while the conductors 62 establish communication between decks. All of said conductors are preferably bolted on the tank wall and when removed, expose the openings 51 and 52 at the ends of the trays, whereby said openings may be used as access openings for cleaning, or other purposes.

It is pointed out that the tank together with the vapor or gas and liquid inlets and outlets forms no part of the invention which lies in the decks and their associate parts. Therefore, the liquid may be introduced and drawn off between decks, and the usual customary devices, such as indicators, thermometers and the like, which are used in bubble towers may be employed.

Although the invention has been described with liquid circulating downwardly through the apparatus, instances may arise where no liquid would be so circulated. Such an instance might be present when the gas or vapor carries heavy liquid particles in suspension, in which case this gas or vapor may flow upwardly through the trays and chambers. As the gaseous fluids pass through the trays, the lugs 43 and cages 44 which said fluids contact, accomplish this separation. The heavy liquid particles which are separated fall into the trays and are drained therefrom through the conductors, or separate conductors could be provided. The lighter gaseous products will, of course, continue their upward travel through the device.

In Figures 16 to 18, a modified form of the invention is shown, wherein decks A' are substituted for the decks A1, A2, A3 and A4. Each deck extends transversely of the tank 10' and a passage B', similar to the passage B in the first form, is formed at one side thereof. The passages B' of the decks A' are staggered or offset 180 degrees, as is clearly shown in Figure 16. Each deck is secured to the tank wall and its free end, which is adjacent the passage B', is turned upwardly to form a flange 65, whereby each deck forms a tray. A partition 66 depends from each deck and has its lower end extending into the next deck or tray therebelow. The lower edge of each partition is provided with elongate lugs 43', similar to the lugs 43 of the first form. Vertical bars or strips 44' depend from the lugs.

The uppermost deck has the partition 67 of a hood plate 68 extending thereinto and this partition is constructed in the same manner as the partitions 66. A vertical passage 69 is provided at one side of the plate 68. Manifestly, in this form the decks A' form individual superposed trays and each tray has communication with the tray therebelow through the passages B', whereby the gaseous fluids flowing upwardly through the tank may pass from one deck to the next. The trays are also connected to each other by exterior conductors 70, which are similar to the conductors 41, and the operation of this form is substantially the same as the first form. Each deck A' forms one complete tray, whereas each deck in the tank shown in Figure 1, is provided with a plurality of trays.

What I claim and desire to secure by Letters Patent is:

1. A bubble tower including, a tank, a plurality of superposed decks within the tank, each deck having a plurality of transverse trays which are each located in a different horizontal plane, whereby said trays are in stepped relation within the tank, means for establishing communication between the uppermost tray of each deck and the lowermost tray in the deck next above, means for maintaining a liquid level in the trays, and baffle means for conducting a gas through each of said decks by causing it to flow in a series through and to a point beneath the liquid surface in the trays of said deck, whereby the gas intimately contacts the liquid within each tray in its travel.

2. A bubble tower including, a tank, a plurality of superposed decks within the tank, each deck having a plurality of transverse trays which are each located in a different horizontal plane, whereby said trays are in stepped relation within the tank, means for establishing communication between the uppermost tray of each deck and the lowermost tray in the deck next above, means for conducting a liquid downwardly of the tank and longitudinally of the trays, means for maintaining a liquid level in the trays, and baffle means for conducting a gas through each of said decks by causing it to flow in a series through and to a point beneath the liquid surface in the trays of said deck, whereby the gas intimately contacts the liquid.

3. A bubble tower including, a tank, a plurality of superposed decks within the tank, each deck having a plurality of transverse trays which are each located in a different horizontal plane, whereby said trays are in stepped relation within the tank, means for establishing communication between the uppermost tray of each deck and the lowermost tray in the deck next above, means for maintaining a liquid level in the trays, partitions depending from each deck and extending into the liquid in the trays of the deck therebelow whereby chambers are formed above the trays of each deck with a liquid seal between each chamber, and means for conducting a gas to the lowermost tray of the bottom deck, whereby the gas flows through the liquid in said tray beneath the partition therein to reach the next chamber and tray and then flows successively through the chambers and trays to pass through the liquid in all of said trays.

4. A bubble tower including, a tank, a plurality of superposed decks within the tank, each deck having a plurality of transverse trays which are each located in a different horizontal plane, whereby said trays are in stepped relation within the tank, means for establishing communication between the uppermost tray of each deck and the lowermost tray in the deck next above, means for maintaining a liquid level in the trays, partitions depending from each deck and extending into the liquid in the trays of the deck therebelow whereby chambers are formed above the trays of each deck with a liquid seal between each chamber, means for conducting a gas to the lowermost tray of the bottom deck, whereby the gas flows through the liquid in said tray beneath the partition therein to reach the next chamber and tray and then flows successively through the chambers and trays to pass through the liquid in all of said trays, and parallel bars or strips depending from each partition and submerged in the liquid within the tray in which the partition extends for enhancing the contact between the gas and liquid.

5. A bubble tower including, a tank, a plurality of superposed decks within the tank, each deck having a plurality of transverse trays which are each located in a different horizontal plane, whereby said trays are in stepped relation within the tank, means for establishing communication between the uppermost tray of each deck and the lowermost tray in the deck next above for conducting a gas from one deck to another, exterior conductors for connecting the interior of the trays, means for introducing a liquid into the upper tray of the uppermost deck whereby said liquid flows successively through the trays, means for maintaining a liquid level in each tray, and baffle means for conducting a gas through each of said decks by causing it to flow in a series through and to a point beneath the liquid surface in the trays of said deck, whereby the gas intimately contacts the liquid within each tray.

6. A bubble tower including, a tank, a plurality of superposed decks within the tank, each deck having a plurality of transverse trays which are each located in a different horizontal plane, whereby said trays are in stepped relation within the tank, means for establishing communication between the uppermost tray of each deck and the lowermost tray in the deck next above for conducting a gas from one deck to another, exterior conductors for connecting the interior of the trays, means for conducting a liquid downwardly of the tank and longitudinally of the trays, means for maintaining a liquid level in the trays, and baffle means for conducting a gas through each of said decks by causing it to flow in a series through and to a point beneath the liquid surface in the trays of said deck, whereby the gas intimately contacts the liquid.

7. A bubble tower including, a tank, a plurality of superposed decks within the tank, each deck having a plurality of transverse trays which are each located in a different horizontal plane, whereby said trays are in stepped relation within the tank, means for establishing communication between the uppermost tray of each deck and the lowermost tray in the deck next above, means for maintaining a liquid level in the trays, partitions depending from each deck and extending into the liquid in the trays of the deck therebelow whereby chambers are formed above the trays of each deck with a liquid seal between each chamber, means for conducting a gas to the lowermost tray of the bottom deck, whereby the gas flows through the liquid in said tray beneath the partition therein to reach the next chamber and tray and then flows successively through the chambers and trays to pass through the liquid in all of said trays, and means for preventing the gas from by-passing around any one tray, whereby said gas must pass through all trays.

8. A bubble tower including, a tank, a plurality of superposed decks within the tank, each deck having a plurality of transverse trays which are each located in a different horizontal plane, whereby said trays are in stepped relation within the tank, means for establishing communication between the uppermost tray of each deck and the lowermost tray in the deck next above, adjustable means for maintaining a desired liquid level in each tray, partitions depending from each deck and extending into the liquid in the trays of the deck therebelow whereby chambers are formed above the trays of each deck with a liquid seal between each chamber, and means for conducting a gas to the lowermost tray of the bottom deck, whereby the gas flows through the liquid in said tray beneath the partition therein to reach the next chamber and tray and then flows successively through the liquid in the chambers and trays to contact the liquid in all of said trays.

9. A bubble tower including, a tank, a plurality of superposed decks within the tank, each deck having a plurality of substantially flat transverse trays which are each located in a different horizontal plane, whereby said trays are in stepped relation within the tank, means for establishing communication between the uppermost tray of each deck and the lowermost tray in the deck next above, means for maintaining a liquid level in the trays, partitions depending from each deck and extending into the liquid in the trays of the deck therebelow whereby chambers are formed above the trays of each deck with a liquid seal between each chamber, means for conducting a gas to the lowermost tray of the bottom deck, whereby the gas flows through the liquid in said tray beneath the partition therein to reach the next chamber and tray and then flows successively through the liquid in the chambers and trays thereby passing through the liquid in each tray, and projecting lugs at the lower ends of said baffles provided with depending strips, said lugs and strips being submerged in the liquid within the trays.

10. A device for promoting liquid-gas contact including, a tank, a plurality of superposed decks within the tank, a plurality of transversely extending trays in different elevations on each deck, means for flowing a liquid downwardly of the tank and through the trays, said liquid flowing in a path longitudinally of each tray, means for maintaining a body of liquid in each tray, and means for conducting a gas upwardly through the tank and through the liquid of each tray therein in successive order, said gas flowing in a path across the direction of flow of the liquid, whereby the path of the gas which contacts the liquid is substantially at a right angle to the path of the flowing liquid in said trays, whereby assuring intimate contact between the gas and liquid.

11. A device for promoting liquid-gas contact including, a tank, a plurality of superposed decks within the tank, a plurality of transverse trays in different elevations on each deck, adjustable means for maintaining a desired liquid level in each tray, and baffle means for conducting a gas through each of said decks by causing it to flow in a series through and to a point beneath the liquid surface in the trays of said deck, whereby the gas intimately contacts the liquid within said trays.

12. A device for promoting liquid-gas contact including, a tank, a plurality of superposed decks within the tank, a plurality of transversely extending trays on each deck, means for flowing a liquid downwardly of the tank and through the trays, said liquid flowing in a path longitudinally of each tray, adjustable means for maintaining a desired liquid level in each tray, and baffle means for conducting a gas through each of said decks by causing it to flow in a series through and to a point beneath the liquid surface in the trays of said deck, said gas flowing in a path across the direction of flow of the liquid, whereby the path of the gas which passes through the liquid is substantially at a right angle to the path of the flowing liquid in said trays, thereby assuring intimate contact between the gas and liquid.

WILLIAM M. WELCH.